US008537031B2

(12) United States Patent
Niel

(10) Patent No.: US 8,537,031 B2
(45) Date of Patent: Sep. 17, 2013

(54) AUDIBLE BLIND SPOT INDICATOR

(75) Inventor: Michael J. Niel, Redford, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 395 days.

(21) Appl. No.: 12/894,834

(22) Filed: Sep. 30, 2010

(65) Prior Publication Data

US 2012/0081233 A1 Apr. 5, 2012

(51) Int. Cl.

*G08G 1/00* (2006.01)
*G08B 29/00* (2006.01)
*B60Q 1/00* (2006.01)

(52) U.S. Cl.

USPC ........... 340/904; 340/903; 340/435; 340/514; 340/692

(58) Field of Classification Search

USPC ........ 340/904, 903

See application file for complete search history.

(56) References Cited

U.S. PATENT DOCUMENTS 5,325,096 A 6/1994 Pakett
5,517,196 A 5/1996 Pakett et al.
6,097,285 A * 8/2000 Curtin ........ 340/436
6,339,369 B1 * 1/2002 Paranjpe ........ 340/436
6,880,941 B2 * 4/2005 Suggs ........ 359/843
7,697,698 B2 4/2010 Brown

FOREIGN PATENT DOCUMENTS

WO WO-94/04941 A1 3/1994

* cited by examiner

*Primary Examiner* — Donnie Crosland
(74) *Attorney, Agent, or Firm* — Gifford, Krass, Sprinkle, Anderson & Citkowski, P.C.

(57) ABSTRACT

An audible blind spot indicator for a motor vehicle having a blind spot detection system is provided. The audible blind spot indicator can include an audible module that has a first tone generator operable to generate a first tone frequency and a second tone generator operable to generate a second tone frequency that is different than the first tone frequency.

14 Claims, 2 Drawing Sheets

AUDIBLE BLIND SPOT INDICATOR

FIELD OF THE INVENTION

The present invention is related to a blind spot detection system for a motor vehicle, and in particular, to the testing of a blind spot detection system using an audible blind spot indicator.

BACKGROUND OF THE INVENTION

Blind spot detection systems for motor vehicles that can alert a driver that another motor vehicle is within his or her blind spot are known. Such blind spot detection systems typically provide a visual signal, e.g. signal lights on left and right rear view minors, to a driver of the motor vehicle when the driver activates a left or right turn signal and an object is detected within a blind spot on the left hand side or right hand side, respectively, of the vehicle.

In order to develop improved blind spot detection systems for motor vehicles, motor vehicle manufacturers typically test the blind spot detection system by driving the vehicle through traffic and noting when the blind spot detection system accurately detects a motor vehicle within a given blind spot, when a false detection occurs and when a missed detection occurs. In order for such testing to be performed, a driver typically drives the vehicle through various traffic patterns while one or two additional individuals seated in the motor vehicle attempt to determine and keep note of accurate and false blind spot detections.

Heretofore testing systems have relied on the one or two additional individuals to observe when: (1) a blind spot indicator light is activated and whether or not a motor vehicle is actually within a blind spot; and (2) a motor vehicle is within a blind spot and a blind spot indicator light fails to be activated.

When one individual is attempting to keep track of the accurate and false blind spot detections, the individual must continually look back and forth between left hand side and right hand side visual blind spot detection signals and also look to see if a motor vehicle is actually within a given blind spot as predicted by the visual alert. And if two individuals are attempting to determine accurate and false blind spot detections, each individual must still look between a given visual alert and whether or not a vehicle is present within the respective blind spot of the motor vehicle. Such procedures can lead to errors in detecting whether or not accurate and/or false blind spot detections have occurred. Therefore, an improved apparatus and/or process for testing a blind spot detection system for a motor vehicle would be desirable.

SUMMARY OF THE INVENTION

The present invention discloses an audible blind spot indicator for a motor vehicle. The audible blind spot indicator can include a blind spot detection system for the motor vehicle that is operable to detect an object within a right hand side blind spot and/or within a left hand side blind spot of the motor vehicle. The indicator can also include an audible module that has a first tone generator operable to generate a first tone frequency and a second tone generator operable to generate a second tone frequency. The first tone frequency can be different than the second tone frequency.

A processor can also be included and be in electronic communication with the blind spot detection system and the audible module. The processor can activate the first tone generator when the blind spot detection system detects an object within the right hand side blind spot and activate the second tone generator when the blind spot detection system detects an object within the left hand side blind spot. In this manner, a different tone frequency is produced by the audible module depending upon which side of the vehicle an object is detected. As such, an individual that is participating in the testing of the blind spot detection system does not have to continually look back and forth between a visual blind spot detection signal and a given blind spot.

The blind spot detection system can have an outlet electrical plug and the audible module can have an inlet electrical plug. It is appreciated that the outlet electrical plug can be electrically connected or plugged into to the inlet electrical plug. In addition, the audible module can have a power source such as the motor vehicle itself or a battery attached to the audible module. If the motor vehicle is the power source, the audible module can have a cigarette lighter power adapter cable that can be plugged into a cigarette lighter socket of the motor vehicle.

The audible module can also have a volume control for the first tone generator and the second tone generator and/or a testing switch for testing the first and second tone generators.

A process for testing the blind spot detection system can include providing the motor vehicle with the blind spot detection system, the system operable to detect an object within the right hand side blind spot and an object within a left hand side blind spot of the motor vehicle. The audible module as described above is also provided as described above and electronically connected to the blind spot detection system of the motor vehicle. Thereafter, the motor vehicle is operated or driven such that objects enter the right hand side and left hand side blind spots. A first signal from the blind spot detection system is generated and relayed to the audible module when the system detects an object within the right hand side blind spot, and the audible module energizes the first tone generator upon receiving the first signal. In addition, a second signal is generated and relayed from the blind spot detection system to the audible module when the system detects an object within the left hand side blind spot of the motor vehicle, and the audible module energizes the second tone generator upon receiving the second signal.

DETAILED DESCRIPTION OF THE INVENTION

Figure 1:
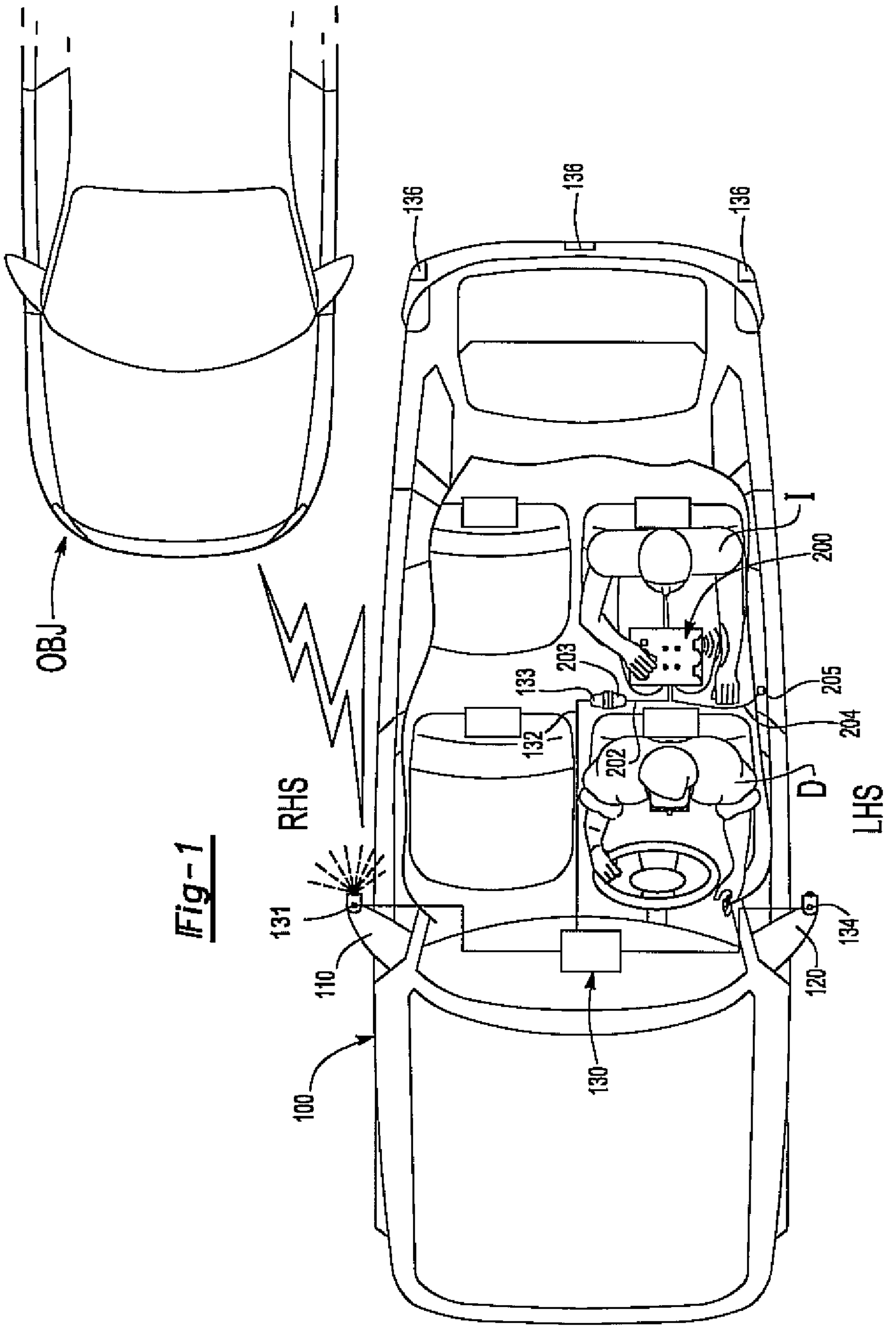
FIG. 1 is a schematic illustration of a motor vehicle with a blind spot detection system and a separate motor vehicle within a right hand side blind spot of the motor vehicle.

The present invention discloses an audible blind spot indicator that can be used for testing a motor vehicle blind spot detection system. In addition, a process for testing the blind spot detection system is also provided. As such, the present invention has utility as a testing apparatus and/or as a process for testing a motor vehicle safety device.

The audible blind spot indicator can include a motor vehicle blind spot detection system (BSDS) that is operable to detect an object within a right hand side (RHS) blind spot and an object within a left hand side (LHS) blind spot of the motor vehicle. Such blind spot detection systems are known to those skilled in the art and may or may not include light indicators attached to a left rearview minor and a right rearview mirror of the motor vehicle. The BSDS can activate a light indicator on a given side of the motor vehicle when the system detects an object within the particular blind side thereof.

The audible blind spot indicator can also include an audible module that has a first tone generator operable to generate a first tone frequency and a second tone generator operable to generate a second tone frequency. The first tone frequency can be different than the second tone frequency such that an individual can easily determine whether the first tone frequency or the second tone frequency has been produced by the audible module.

A processor can further be included and be in electronic communication with the blind spot detection system of the motor vehicle and with the audible module. The processor can activate the first tone generator when the BSDS detects an object within the RHS blind spot and activate the second tone generator when the BSDS detects an object within the LHS blind spot. In this manner, the audible blind spot indicator provides a first tone when the blind spot detection system indicates that a motor vehicle is within the RHS blind spot of the motor vehicle and a second tone when a motor vehicle is within the LHS blind spot. It is appreciated that the first tone, which is noticeably different than the second tone, can aid an individual testing the BSDS whether or not an actual vehicle is within the RHS and/or the LHS blind spots of the vehicle.

The audible module can be in electronic communication with the blind spot detection system through a wireless communication, or in the alternative, through a wired communication. For example and for illustrative purposes only, the blind spot detection system can have an outlet electrical plug and the audible module can have an inlet electrical plug. It is appreciated that the outlet electrical plug can be electrically connected to the inlet electrical plug as is known to those skilled in the art. In addition, the audible module can have a power source such as a battery, or in the alternative the power source can be the motor vehicle. In the event that the power source is the motor vehicle, the audible module can have a cigarette lighter power adapter cable that can be plugged into a cigarette lighter socket of the motor vehicle.

The audible module can also have a volume control for the first tone generator and/or the second tone generator, such that the first tone and/or the second tone can be adjusted to a desired level by an individual testing the blind spot detection system of the motor vehicle. A testing switch for testing the first tone generator and/or the second tone generator can also be included in order to ensure that the volume and/or operation of the first tone generator and/or second tone generator is sufficient.

Turning now to FIG. 1, a schematic illustration of a motor vehicle 100 with an object OBJ within a RHS blind spot is shown. The motor vehicle 100 can have a right rearview minor 110, a left rearview minor 120 and a BSDS 130. The BSDS 130 can include an indicator light 131 for the RHS of the vehicle 100 and an indicator light 134 for the LHS. As known to those skilled in the art, the BSDS 130 can include a radar-based system having sensors 136, and possibly sensors located proximate to the indicator lights 132 and 134. The sensors afford for detection of an object within the RHS and/or LHS blind spots. As shown in FIG. 1, the object OBJ in the form of a motor vehicle has been detected by the BSDS 130 and the indicator light 132 has been illuminated.

In order to improve and/or develop the BSDS 130, the system can be tested with a driver D driving the vehicle 100 through various traffic patterns while an individual I observes the RHS and LHS of the vehicle. In order to aid the individual I in determining accurate and false motor vehicle detections within the RHS and LHS blind spots, an audible module 200 in electronic communication with the BSDS 130 is included. For example, the BSDS 130 can have an electrical outlet line 132 with an outlet plug 133 and the audible module 200 can have an electrical inlet line 202 with an inlet plug 203. It is appreciated that the outlet plug 133 and inlet plug 203 are complimentary and afford for an electrical connection between the outlet line 132 and inlet line 202 as is known to those skilled in the art.

Figure 2:
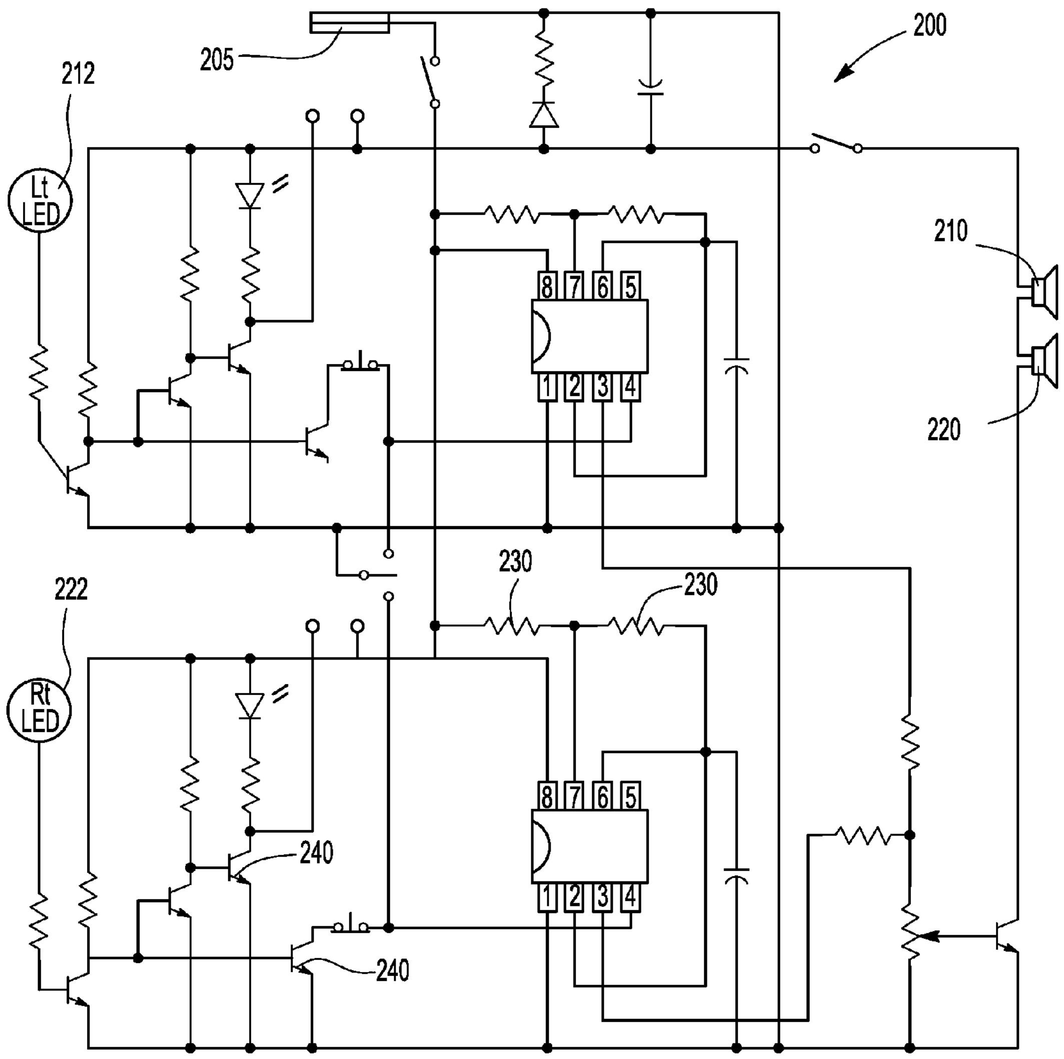
FIG. 2 is an electrical schematic diagram of an audible module according to an embodiment of the present invention.
Figure 3:
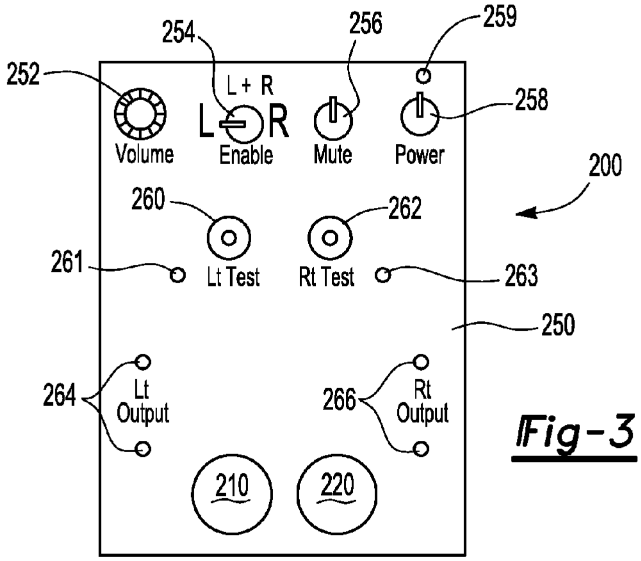
FIG. 3 is a schematic illustration of a panel for an embodiment of an audible module according to an embodiment of the present invention.

An embodiment of the audible module 200 is shown in FIGS. 2 and 3 with FIG. 2 providing an electronic circuit diagram and FIG. 3 providing an illustration of a front or top panel for the module 200. The electrical circuit can include any number of LED lights 212, 222, resistors 230, transistors 240, and the like as shown in FIG. 2. In addition, the electronic circuit can include a first tone generator 210 and a second tone generator 220. For example and for illustrative purposes only, the first tone generator 210 and the second tone generator 220 can be in the form of speakers.

A top or front panel 250 of the audible module 200 can include a location for the first tone generator 210 and the second tone generator 220 to provide sound for an individual. In addition, the panel 250 can have a left testing switch 260 and a right testing switch 262. The left testing switch 260 may or may not have an associated light emitting diode (LED) 261, and likewise, the right testing switch 262 may or may not have an associated LED 263. It is appreciated that the left and right testing switches 260, 262 can be used to test whether or not the first tone generator 210 and the second tone generator 220 are operational, and if the volume of each tone generator is sufficient.

Regarding the volume of the tone generators 210, 220, a volume control 252 affords for their volume control. In addition, the first and second tone generators 210, 220 can be enabled or disabled using an enablement switch 254 and/or muted using a mute switch 256. A power switch 258 with an associated LED 259 can also be provided in order to power up or power down the audible module 200.

Left output jacks 264 and right output jacks 266 can can afford for electronic communication between the audible module 200 and a separate indicating device such as an LED, candescent light, and the like. In the alternative, the left and right output jacks 264, 266 can provide object detection signals to a separate recording device.

In operation, the driver D operates and drives the motor vehicle 100 through various traffic patterns such as city driving, neighborhood driving, rural driving, and the like. The blind spot detection system 130 is activated and in operation while the driver D operates the motor vehicle 100. The individual I sitting within the motor vehicle notes when the blind spot detection system 130 detects an object within the RHS blind spot and/or LHS blind spot of the motor vehicle using the audible module 200 which provides a first tone when the BSDS 130 detects an object within the RHS blind spot and a second tone when the system detects an object within the LHS blind spot. The individual can further determine whether or not a vehicle is within the RHS or LHS blind spot upon hearing a given tone, i.e. whether or not a false detection or missed detection of a motor vehicle has occurred. In this manner, the individual I does not have to continuously look back and forth between the first indicator light 132, the second indicator light 134 and the RHS blind spot and/or the LHS blind spot.

The invention is not restricted to the illustrative examples and embodiments described above. The examples and embodiments are not intended as limitations on the scope of the invention. Processes, apparatus, and the like described herein are exemplary and not intended as limitations on the scope of the invention. Changes herein and other uses will occur to those skilled in the art. The scope of the invention is defined by the scope of the claims.

I claim:

1. An audible blind spot indicator for testing a blind spot detection system of a motor vehicle comprising:

a blind spot detection system for a motor vehicle operable to detect an object within a right hand side (RHS) blind spot and an object within a left hand side (LHS) blind spot of the motor vehicle when a driver is driving the motor vehicle;

a portable audible module separate from said blind spot detection system and held by an individual not driving the motor vehicle, said portable audible module having a first tone generator with a first tone frequency and a second tone generator with a second tone frequency that is different than said first tone frequency;

a processor in electronic communication with said blind spot detection system and said audible module, said processor activating said first tone generator when said blind spot detection system detects an object within the RHS blind spot and activating said second tone generator when said blind spot detection system detects an object within the LHS blind spot, for the purpose of testing said blind spot detection system.

2. The audible blind spot indicator of claim 1, wherein said blind spot detection system has an outlet electrical plug and said audible module has an inlet electrical plug, said outlet electrical plug electrically connected to said inlet electrical plug.

3. The audible blind spot indicator of claim 1, wherein said audible module has a power source.

4. The audible blind spot indicator of claim 3, wherein said power source is the motor vehicle.

5. The audible blind spot indicator of claim 4, wherein said audible module has a cigarette lighter power adapter cable operable to plug into a cigarette lighter socket of the motor vehicle for power.

6. The audible blind spot indicator of claim 1, wherein said power source is a battery attached to said audible module.

7. The audible blind spot indicator of claim 1, wherein said audible module has a volume control for said first tone generator and said second tone generator.

8. The audible blind spot indicator of claim 1, wherein said audible module has a testing switch for testing said first tone generator and said second tone generator.

9. A process for testing a blind spot detection system for a motor vehicle, the process comprising:

providing a motor vehicle having a blind spot detection system (BSDS) operable to detect an object within a right hand side (RHS) blind spot and an object within a left hand side (LHS) blind spot of the motor vehicle when a driver is driving the motor vehicle;

providing a portable audible module separate from the BSDS and held by an individual not driving the motor vehicle, the separate audible module having a first tone generator with a first tone frequency and a second tone generator with a second tone frequency that is different than said first tone frequency;

electronically connecting the audible module to the BSDS;

driving the motor vehicle such that objects enter the RHS and LHS blind spots of the motor vehicle;

relaying a first signal from the BSDS to the audible module when the BSDS detects an object within the RHS blind spot, the audible module energizing the first tone generator upon receiving the first signal; and relaying a second signal from the BSDS to the audible module when the BSDS detects an object within the LHS blind spot, the audible module energizing the second tone generator upon receiving the second signal.

10. The process of claim 9, wherein the audible module is electronically connected to the BSDS using an electrical outlet cord from the BSDS in connection with an electrical inlet cord from the audible module.

11. The process of claim 9, wherein the audible module is powered by the motor vehicle using a cigarette lighter power adapter cable plugged into a cigarette lighter socket of the motor vehicle.

12. The process of claim 9, wherein the audible module is powered by a battery attached to the audible module.

13. The process of claim 9, wherein the audible module has a volume adjustment for and the volume of the first tone frequency is adjusted using the volume adjustment.

14. The process of claim 9, wherein the audible module has a testing switch and the first tone generator and the second tone generator are tested prior to driving of the motor vehicle using the testing switch.

* * * * *